LOCOMOTIVE CONTROL SYSTEM
Filed March 15, 1934
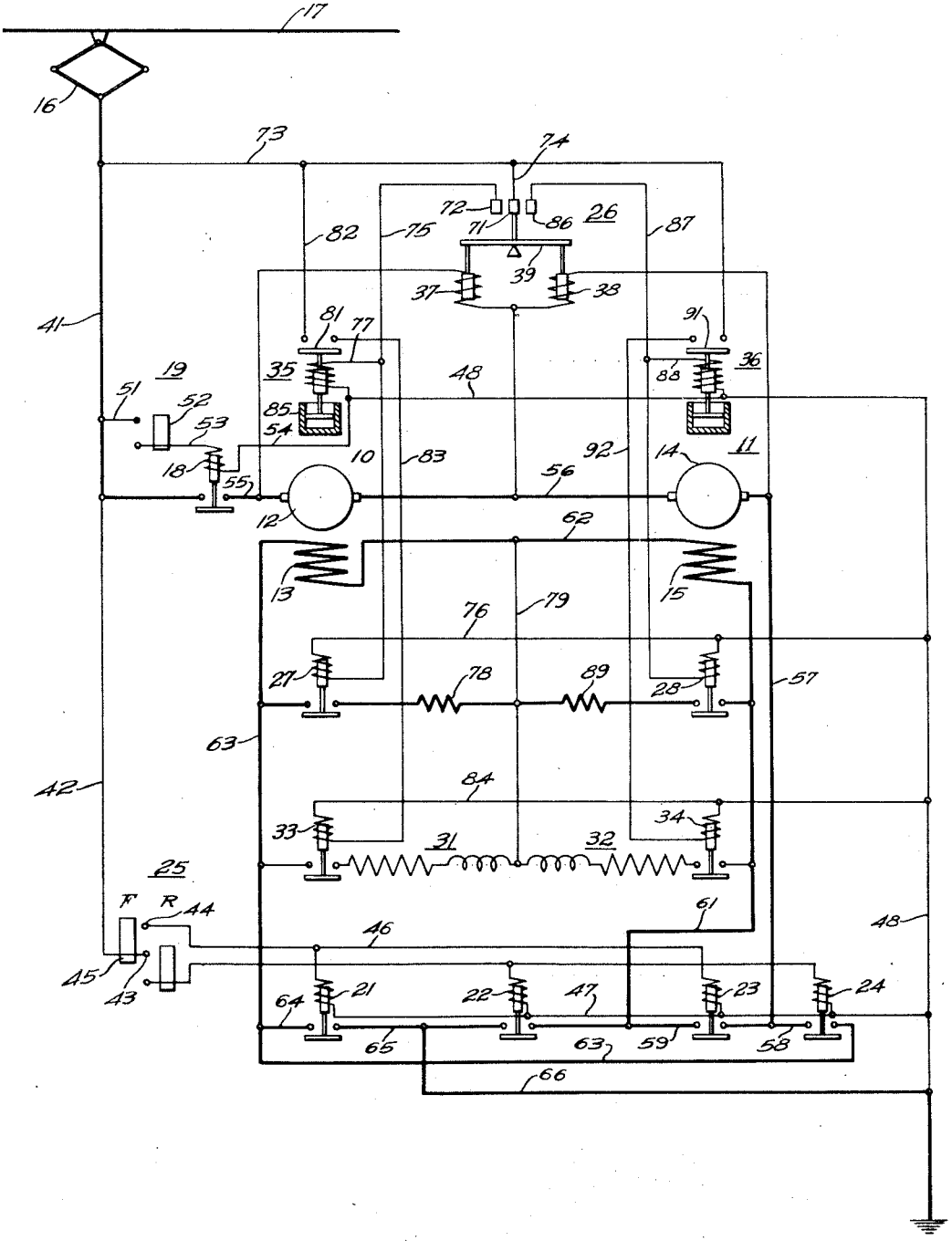
WITNESSES:
INVENTORS
Richard L. Kimball &
David J. Munro.
BY
Crawford
ATTORNEY

UNITED STATES PATENT OFFICE 2,020,947

LOCOMOTIVE CONTROL SYSTEM

Richard L. Kimball, Forest Hills, Pa., and David J. Munro, Montreal, Quebec, Canada, assignors to Westinghouse Electric & Manufacturing Company, East Pittsburgh, Pa., a corporation of Pennsylvania Application March 15, 1934, Serial No. 715,627

7 Claims. (Cl. 172—179)

Our invention relates, generally, to locomotive control systems and more particularly to systems for preventing wheel-slippage on electric vehicles having individual motor-driven axles.

The copending application of Norman W. Storer, Serial No. 599,940, filed March 19, 1932, now Patent No. 1,976,525 issued Oct. 9, 1934, describes a system for preventing wheel-slippage on locomotives propelled by direct-current motors having series field windings, by cross-connecting portions of the field windings of the motors which are connected in parallel. However, the system disclosed in the Storer application is effective only when the motors are operating in parallel and not when they are connected in series-circuit relation, as during the starting of the locomotive.

In U. S. Patent No. 1,870,469, issued August 9, 1932 to F. H. Shepard and assigned to the Westinghouse Electric & Manufacturing Company, there is described and claimed a system for preventing wheel-slippage, when the motors are operating in series, by shunting the field windings of the motors on the leading axles of a locomotive, thereby reducing the torque of the motors driving the wheels which have a tendency to slip because of weight transfer when the locomotive is operating in one direction. When the direction of operation is reversed, provision is made for shunting the field windings of the motors on the axles which then become the leading axles. However, the field shunting operation in the system disclosed in the patent to Shepard is manually controlled by the operator of the locomotive and no provision is made for automatically correcting wheel-slippage.

An object of our invention, generally stated, is to provide for automatically correcting the slipping of the driving wheels of an electrically propelled vehicle.

A more specific object of our invention is to limit the slipping of any one or all of the driving axles of a locomotive when the traction motors are connected in series-circuit relation.

Other objects of our invention will be fully described hereinafter or will be apparent to those skilled in the art.

In accordance with the preferred embodiment of our invention, a balanced relay having two potential coils is utilized to automatically correct the slipping of two axles having their traction motors connected in series. One of the relay coils is connected across each of the motor armatures and under normal conditions the relay is held in the neutral position by the equal motor potentials. Slipping of one axle will cause an unbalance of the motor voltages which, in turn, unbalances the relay, thereby establishing circuits for shunting the field of the motor on the slipping axle to reduce the torque of that motor to such a value that the slipping will stop. At the same time, circuits are established to provide for a graduated removal of the shunting after the slipping has been corrected. If the locomotive is provided with more than two driving axles, additional relays may be provided to control the other motors.

For a fuller understanding of the nature and objects of our invention, reference may be had to the following detailed description, taken in conjunction with the accompanying drawing, in which the single figure is a diagrammatic view of a control system embodying our invention.

Referring to the drawing, the system shown comprises electric motors 10 and 11 of a type suitable for propelling an electric vehicle or locomotive (not shown). The motor 10 is provided with an armature winding 12 and a field winding 13 and the motor 11 with an armature winding 14 and a field winding 15. As shown, the motors 10 and 11 are connected in series-circuit relation and are energized through a pantograph collector 16, which engages an overhead conductor 17.

A line switch 18, which is controlled by a controller 19, is provided for connecting the motors to the power source and reversing switches 21, 22, 23 and 24 are provided for reversing the direction of current flowing in the field windings 13 and 15, thereby reversing the direction of rotation of the motors 10 and 11. The operation of the reversing switches is controlled by a reverser 25, which may be of the drum type. In order to simplify the drawing and description, the accelerating resistors and switches, which are usually provided for controlling the acceleration of the motors 10 and 11, have been omitted, as this method of controlling the acceleration of electric motors is well known in the art.

In order to automatically correct slipping or spinning of the wheels mounted on the axles driven by the motors 10 and 11, a balanced relay 26 is provided for controlling the operation of switches 27 and 28, which are disposed to shunt the field windings 13 and 15, respectively, thereby reducing the torque delivered to the slipping axle by the motor driving it, which corrects the slipping condition.

In order that full-field strength will not be applied to the motor immediately after the slipping condition has been corrected, which might cause a reoccurrence of slipping, provision is shown, field shunts 31 and 32, each comprising a resistor and a reactor, are also disposed to be connected across the field windings 13 and 15, respectively, by means of switches 33 and 34. The operation of the switches 33 and 34 is controlled by time delay relays 35 and 36, respectively, which cooperate with the balanced relay 26 to control the shunting of the field windings 13 and 15, as will be described more fully hereinafter.

As shown, the balanced relay 26 is provided with two actuating coils which are so disposed that they effect a balanced condition of a beam 39 when the coils are energized by equal potentials. The coil 37 is connected across the armature winding 12 of the motor 10 and is, therefore, energized by the counter-electromotive force of this motor. Likewise, the coil 38 is connected across the armature 14 of the motor 11 and is energized by the counter-electromotive force of that motor. Therefore, the relay is balanced while the motors are operating at the same speed, but, if the wheels driven by one motor start to slip, the speed of that motor increases and its counter-electromotive force is proportionately increased, thereby creating an unbalance in the relay which operates to cause the field shunting switches for the slipping motor to be closed to shunt its field winding and reduce the torque delivered to the slipping axle, which will immediately correct the slipping condition.

In order that the functioning of the foregoing apparatus may be better understood, the operation of the system will now be described in more detail. Assuming that it is desired to set the vehicle propelled by the motors 10 and 11 in motion in the forward direction, the reversing controller 25 may be actuated to position "F", thereby energizing the actuating coils of the reversing switches 21 and 23. The energizing circuit for the coils of these switches may be traced from the power conductor 41 through conductor 42, contact fingers 43 and 44 which are engaged by a contact segment 45, conductor 46, thence through the actuating coils 21 and 23, which are in parallel circuit relation, and conductor 47 to the grounded conductor 48.

The controller 19 may then be operated to energize the actuating coil of the line switch 18 through a circuit which extends from the power conductor 41 through conductor 51, the contact segment 52 of the controller 19, conductor 53, the actuating coil of the switch 18 and conductor 54 to the grounded conductor 48. The closing of the line switch 18 and the reversing switches 21 and 23 connects the motors 10 and 11 to the power conductor 41 through a circuit which may be traced from the power conductor 41 through the contact members of the line switch 18, conductor 55, the armature winding 12 of the motor 10, conductor 56, the armature winding 14 of the motor 11, conductors 57 and 58 the contact members of the switch 23, conductors 59 and 61, the field winding 15, conductor 62, the field winding 13, conductors 63 and 64, the switch 21 and conductors 65 and 66 to the grounded conductor 48. In this manner, the motors 10 and 11 are connected to the power source, with their armature windings and field windings connected in series circuit relation, and the motors will operate in the forward direction.

If it is desired to operate the motors in the reverse direction, the controller 19 may be first by disconnecting the motor from the power source, and the reversing controller 25 may then be actuated to position "R", after which the controller 19 may be actuated to close the line switch 18, thereby reconnecting the motors to the power source.

When the reversing controller 25 is actuated from position "F" to position "R", the reversing switches 21 and 23 are deenergized and the actuating coils of the switches 22 and 24 are energized, thereby opening the switches 21 and 23 and closing the switches 22 and 24 to reverse the direction of current flowing through the field windings 13 and 15, which reverses the direction of rotation of the motors 10 and 11. The motor circuit may now be traced from the power conductor 41 through the line switch 18, conductor 55, the armature winding 12, conductor 56, the armature winding 14, conductors 57 and 58, the switch 24, conductor 63, the field winding 13, conductor 62, the field winding 15, conductors 61 and 59, the switch 22 and conductors 65 and 66 to the grounded conductor 48.

As previously stated, the actuating coil 37 of the relay 26 is connected across the armature winding 12 of the motor 10 and the coil 38 is connected across the armature 14 of the motor 11. Therefore, the relay 26 is maintained in a balanced condition so long as the motors 10 and 11 are operating at the same speed.

However, if one of the axles, for instance the one driven by the motor 10, starts to slip, the counter-electromotive force of the motor 10 is increased, creating an unbalanced condition in the relay 26 to cause its contact member 71 to engage the contact member 72, thereby energizing the actuating coils of the field shunting switch 27 and the time delay relay 35. The circuit through the actuating coil of the switch 27 may be traced from the power conductor 41 through conductors 73 and 74, the contact members 71 and 72 of the relay 26, conductor 75, the coil of the switch 27, and conductor 76 to the grounded conductor 48. The circuit for the actuating coil of the relay 35 extends from the conductor 75 through conductor 77, and the coil of the relay 35 to the grounded conductor 48.

In this manner, the field shunting switch 27 is closed to shunt the field winding 13 through resistor 78 and conductor 79, thereby reducing the field strength of the motor 10 and consequently reducing the torque delivered by the motor 10 to the slipping axle which will immediately correct the slipping condition.

As previously stated, the time delay relay 35 is energized simultaneously with the shunting switch 27. Therefore, the contact members 81 of the relay 35 are closed to energize the actuating coil of the switch 33 through a circuit which extends from the conductor 73 through conductor 82, the contact members 81, conductor 83, the actuating coil of the switch 33 and conductor 84 to the grounded conductor 48. The closing of the switch 33 connects the field shunt 31 across the field winding 13. However, this will have no appreciable effect while the switch 27 remains closed to shunt the field winding 13 through the resistor 78 and conductor 79. As soon as the wheel-slipping condition is corrected, thereby restoring the balanced condition to the relay 26, the actuating coils of the field shunting switch 27 and the time relay 35 are de-energized which will permit the switch 27 to be opened immediately. However, since the relay 35 is provided with a time delay device 85, which may be so constructed that the contact members 81 of the relay will not open for a predetermined time interval after the actuating coil of the relay is deenergized, it will be seen that the switch 33 will be held closed for a predetermined time after the switch 27 opens, thereby maintaining the field shunting circuit through the shunt 31.

In this manner, full field strength is not applied to the motor 10 immediately after the slipping conditions is corrected, thereby preventing a reoccurrence of the wheel slippage. It will be understood that additional field shunts may be provided, if desired, which may be disconnected from the motor circuit in successive steps in the manner herein described.

Likewise, if the wheels driven by the motor 11 start to slip, the counter-electromotive force of the motor 11 will increase, thereby placing a higher potential on the coil 38 than on the coil 37 which will operate the relay 26 to energize the field shunting switch 28 and the time delay relay 36. The energizing circuit for the actuating coil of the switch 28 may be traced from the conductor 73 through conductor 74, the contact members 71 and 86 of the relay 26, conductor 87, the coil of the switch 28 and conductor 76 to the grounded conductor 48. The energizing circuit for the relay 36 extends from the conductor 87 through conductor 88 and the actuating coil of the relay 36 to the grounded conductor 48.

Accordingly, the switch 28 is closed to shunt the field winding 15 through conductors 79 and resistor 89, and the switch 34 is also closed to connect the shunt 32 across the field winding 15. The energizing circuit for the actuating coil of the switch 34 is established when the contact members 91 of the relay 36 are closed, this circuit may be traced from the conductor 73 through the contact member 91, conductor 92, the coil of switch 34, and conductor 84 to the grounded conductor 48.

When the slipping condition is corrected, the relay 26 is restored to its normal position, thereby deenergizing the switch 28. However, the time delay relay 36 functions in a manner similar to the relay 35 to prevent the switch 34 from being deenergized to disconnect the shunt 32 until a predetermined time interval after the balanced condition of the relay 26 has been restored, thereby preventing full field strength from being applied to the motor 11 immediately after the slipping condition has been corrected.

From the foregoing description, it is evident that we have provided a system for automatically correcting wheel slippage which may occur in an electrically propelled vehicle. It is also evident that the system herein described has numerous advantages over previously known systems for preventing or correcting wheel slippage in which the field shunting operation is manually controlled by the operator of the vehicle. By utilizing the system herein described, the slipping condition is immediately corrected and the danger of producing a reoccurrence of the slipping, by applying full field strength to the motors immediately after the slipping condition has been corrected, is precluded in the manner herein set forth. Furthermore, it is apparent that the present system may be readily expanded to control the operation of any number of motors on a locomotive by adding additional equipment similar to that herein described. It is also evident that the present system will function properly irrespective of the direction of operation of the locomotive.

We do not desire to be restricted to the particular form or arrangement of parts herein shown and described since it is evident that they may be changed and modified without departing from the spirit and scope of our invention as defined in the appended claims.

We claim as our invention:

1. In a control system for an electrically propelled vehicle having at least two driving axles, in combination, a motor for driving each of the axles, said motors having armature windings and field windings, means for shunting said field windings to reduce the torque delivered to the driving axles, means responsive to the counter electromotive force of the motors for automatically controlling the operation of said shunting means to limit the slipping of the driving axles, and means for gradually removing the shunting means from the motor circuit after the slipping condition is corrected.

2. In a control system for an electrically propelled vehicle having at least two driving axles, in combination, a motor for driving each of the axles, said motors having armature windings and field windings, means for shunting said field windings to reduce the torque delivered to the driving axles, relay means responsive to the counter electromotive force of the motors for controlling the operation of said shunting means to limit the slipping of the driving axles, and additional relay means for gradually removing the shunting means from the motor circuit after the slipping condition is corrected.

3. In a control system for an electrically propelled vehicle having at least two driving axles, in combination, a motor for driving each of the axles, said motors having armature windings and field windings, means for shunting said field windings to reduce the torque delivered to the driving axles, a balanced relay having an actuating coil energized by the counter electromotive force of each one of a pair of the driving motors for controlling the operation of said shunting means to limit the slipping of the driving axles, and means for removing the field shunting means in graduated steps after the slipping condition is corrected.

4. In a control system for an electrically propelled vehicle having at least two driving axles, in combination, a motor for driving each of the axles, said motors having armature windings and field windings, switching means for independently shunting each of the motor field windings to reduce the torque delivered by said motor, relay means responsive to an unbalance of the counter electromotive forces of the motors for controlling the operation of said switching means, and means for gradually and independently increasing the motor torque after a balanced condition is restored.

5. In a control system for an electrically propelled vehicle having a plurality of driving axles, in combination, a motor for driving each of the axles separately or in two or more groupings, said motors having armature windings and field windings, at least two of said motors being connected in series-circuit relation, means for shunting the field windings of each of said series-connected motors, switching means for connecting said shunting means in the motor circuit, a balanced relay responsive to the motor voltages for controlling the operation of said switching means to limit the motor torque, thereby correcting the ually disconnecting said shunting means from the motor circuit after the slipping action has been corrected.

6. In a control system for an electrically propelled vehicle having a plurality of driving axles, in combination, a motor for driving each of the axles separately or in two or more groupings, said motors having armature windings and field windings, at least two of said motors being connected in series-circuit relation, means for shunting the field windings of each of said series-connected motors, switching means for connecting said shunting means in the motor circuit, a balanced relay responsive to the motor voltages for controlling the operation of said switching means to limit the motor torque, thereby correcting the trolling the operation of said switching means to disconnect the shunting means from the motor circuit in successive steps after the slipping action has been corrected.

7. In a motor control system, in combination, a pair of electric motors connected to a common load, means for independently reducing the torque delivered by each of said motors, relay means responsive to an unbalance of the counter-electromotive forces of the motors for controlling the torque reducing means, and means for gradually and independently increasing the motor torque after the counter-electromotive forces are balanced.

RICHARD L. KIMBALL.
DAVID J. MUNRO.